US010482491B2

(12) United States Patent
Li et al.

(10) Patent No.: US 10,482,491 B2
(45) Date of Patent: Nov. 19, 2019

(54) TARGETED MARKETING FOR USER CONVERSION

(71) Applicant: INTERNATIONAL BUSINESS MACHINES CORPORATION, Armonk, NY (US)

(72) Inventors: Ying Li, Yorktown Heights, NY (US); Pavankumar Murali, Yorktown Heights, NY (US); Roman Vaculin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 916 days.

(21) Appl. No.: 15/012,343

(22) Filed: Feb. 1, 2016

(65) Prior Publication Data

US 2017/0221090 A1    Aug. 3, 2017

(51) Int. Cl.
*G06Q 30/02* (2012.01)

(52) U.S. Cl.
CPC .............................. *G06Q 30/0244* (2013.01)

(58) Field of Classification Search
CPC ................................................. G06Q 30/0244
See application file for complete search history.

(56) References Cited

U.S. PATENT DOCUMENTS

| 2010/0043037 A1* | 2/2010 | Beyabani ........... H04N 7/17318 725/100 |
| 2011/0178848 A1 | 7/2011 | Rane et al. |
| 2012/0151514 A1* | 6/2012 | Kandanala ......... H04N 5/44543 725/23 |
| 2013/0073336 A1 | 3/2013 | Heath |
| 2013/0290091 A1* | 10/2013 | Benyamin .......... G06Q 30/0269 705/14.41 |
| 2014/0164093 A1 | 6/2014 | Libman |
| 2014/0310103 A1 | 10/2014 | Ricci |

(Continued)

OTHER PUBLICATIONS

Authors et al., Disclosed Anonymously, "Enabling multi party transactions and services over public service networks," IP.com No. 000191555, Jan. 7, 2010.

(Continued)

*Primary Examiner* — Luis A Brown
*Assistant Examiner* — Robert C Johnson
(74) *Attorney, Agent, or Firm* — F. Chau & Associates, LLC (57) ABSTRACT

A method for targeting marketing for user conversion includes receiving a list of users. Data pertaining to the users is received. A conversion likelihood score representing an estimation of how likely the user would be to converted from a trial user to a paid user is determined for each user. A similarity score representing how similar the users of the pair are to one another is determined for each possible pair of users. A graph in which each node thereof represents each user and edges between the nodes have edge weights representing the determined similarity scores is constructed. Each node is associated with a value representing its conversion likelihood score. A marketing potential score is calculated for each user using both the node-associated-values and the edge weights of the graph. A set of target users having highest marketing potential scores is constructed.

11 Claims, 3 Drawing Sheets

(56) References Cited

U.S. PATENT DOCUMENTS

2015/0025979 A1    1/2015   Box et al.
2015/0186932 A1    7/2015   Xu et al.

OTHER PUBLICATIONS

Authors et al., Disclosed Anonymously, "Managing Services for a Service Provider at a Device within Proximity to a Location of the Service Provider, Utilizing Logic of a Centralized Environment," IP.com No. 000191556, Jan. 7, 2010.

Ki Youn Kim, et al., "Marketing insights for mobile advertising and consumer segmentation in the cloud era: a Q-R hybrid methodology and practices," Technological Forecasting & Social Change 91, Feb. 19, 2014, pp. 78-92.

\* cited by examiner

TARGETED MARKETING FOR USER CONVERSION

BACKGROUND

1. Technical Field

The present disclosure relates to marketing targeting and, more specifically, to targeted marketing for user conversion.

2. Discussion of Related Art

Today it is increasingly common for users to make use of software that is centrally hosted. Such software may be referred to as "software as a service" (SaaS). Where the centrally hosted software makes use of various shared computing resources, the offering may be referred to as "cloud computing." A cloud computing platform is a set of resources offered to entities to assist in providing their own cloud computing solutions to their own users.

As there are a wide variety of SaaS, cloud computing, and cloud platforms in use, it is common to offer use of these products to users on a trial basis. The trial basis may be free or low cost and may be provided for a limited time or with a limited set of capabilities. It is the object of the offering entity to convert these trial users to paid users. However, it may be difficult to know which trial users to market which paid options to, especially when the number of trial users is extremely large or the desired method of marketing to trial users is comparatively expensive.

BRIEF SUMMARY

A method for targeted marketing for user conversion includes receiving a list of a plurality of users, the plurality of users including both trial users and paid users. Data pertaining to the plurality of users is received. A conversion likelihood score representing an estimation of how likely the user would be converted from a trial user to a paid user is determined for each user of the plurality of users. A similarity score representing how similar the users of the pair are to one another is determined for each possible pair of users within the plurality of users. A graph in which each node thereof represents each user of the plurality of users and edges between the nodes have edge weights representing the determined similarity scores is constructed. Each node is associated with a value representing its conversion likelihood score. A marketing potential score is calculated for each user of the plurality of users using both the node-associated-values and the edge weights of the graph. A set of target users including trial users having highest marketing potential scores is constructed. An optimized marketing strategy is generated from the set of target users.

The data pertaining to the plurality of users may include dynamic data and static data. The dynamic data may include marketing response data, service consumption data, or other user data. The static data may include sales data or product details.

The conversion likelihood scores for paid users may be set as a maximum value.

The marketing potential score may be calculated as:

$$S_i = \frac{1}{|\psi|} \sum_{j \in \psi} CS(j) + W_{ij} \times CS(i)$$

where $S_i$ is the marketing potential score for each user node i, CS(i) is the conversion likelihood score for each user node i, CS(j) is the conversion likelihood score for each user node j, $W_{ij}$ is the edge weight for the edge connecting each user node i with each user node j, and $\psi$ represents a number of nodes j that are connected to each node i by an edge.

A method for selecting users for targeted marketing includes receiving a list of a plurality of users. Data pertaining to the plurality of users is received. A conversion likelihood score representing an estimation of how likely the user is to consummate a purchase as a result of the targeted marketing is determined for each user of the plurality of users. A similarity score representing how similar the users of the pair are to one another is determined for each possible pair of users within the plurality of users. A graph in which each node thereof represents each user of the plurality of users and edges between the nodes have edge weights representing the determined similarity scores is constructed. Each node is associated with a value representing its conversion likelihood score. A marketing potential score is calculated for each user of the plurality of users using both the node-associated-values and the edge weights of the graph. A set of target users including the users of the plurality of users having highest marketing potential scores is constructed. An optimized marketing strategy is generated from the set of target users.

Determining the conversion likelihood score nay include reducing dimensionality of the received data pertaining to the users, up-sampling or down-sampling the dimensionality-reduced data to remediate unbalanced nature of the dimensionally-reduced data, extracting features from the up/down-sampled data to identify features having high predictive power, training a machine learning model using the extracted features to model conversion likelihood, and applying the trained model to predict the conversion likelihood scores.

A joint optimization framework may be used to identify the set of target users that maximize consummation of purchases as a result of the targeted marketing.

The data pertaining to the plurality of users may include dynamic data and static data.

The dynamic data may include marketing response data, service consumption data, or other user data.

The static data may include sales data or product details.

Determining the similarity score between two users may include mining configuration and activity patterns of the two users from the service consumption data, the service consumption data including cloud layer configurations and logs, creating a customer-specific cloud configuration-behavior characterization for each user, and measuring the similarity between the two users based on the mined configuration and activity patterns and the customer-specific cloud configuration-behavior characterization.

A computer system includes a processor and a non-transitory, tangible, program storage medium, readable by the computer system, embodying a program of instructions executable by the processor to perform method steps for method for targeting marketing for user conversion. The method includes receiving a list of a plurality of users, the plurality of users including both trial users and paid users, receiving data pertaining to the plurality of users, determining, for each user of the plurality of users, a conversion likelihood score representing an estimation of how likely the user would be converted from a trial user to a paid user, determining, for each possible pair of users within the plurality of users, a similarity score representing how similar the users of the pair are to one another, calculating, for each user of the plurality of users, a marketing potential score using both the conversion likelihood scores and the similarity scores, constructing a set of target users including trial users having highest marketing potential scores, and generating an optimized marketing strategy from the set of target users.

Constructing a set of target users may include constructing a graph in which each node thereof represents each user of the plurality of users and edges between the nodes have edge weights representing the determined similarity scores, wherein each node is associated with a value representing its conversion likelihood score.

The marketing potential score may be calculated as:

$$S_i = \frac{1}{|\psi|} \sum_{j \in \psi} CS(j) + W_{ij} \times CS(i)$$

where $S_i$ is the marketing potential score for each user node i, $CS(i)$ is the conversion likelihood score for each user node i, $CS(j)$ is the conversion likelihood score for each user node j, $W_{ij}$ is the edge weight for the edge connecting each user node i with each user node j, and $\psi$ represents a number of nodes j that are connected to each node i by an edge.

The data pertaining to the plurality of users may include dynamic data and static data.

The dynamic data may include marketing response data, service consumption data, or other user data.

The static data may include sales data or product details.

The conversion likelihood scores for paid users may be set as a maximum value.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide systems and methods for automatically targeting marketing to a group of users, for example, where the group of users are trial users of a cloud platform, cloud computing offering, SaaS, etc. However, exemplary embodiments of the present invention are not limited to such applications and may be used, more generally, to target candidates for any marketing campaign.

While exemplary embodiments of the present invention may be described herein in terms of targeting user conversion from trial users to paid users, it is to be understood that the present invention may be applied to targeting users for any conversion in which the user is a user of a first product, service, or set of features, and it is desired that the user become a user of other products, services, or sets of features, regardless of whether this use requires additional subscriptions or payments.

Exemplary embodiments of the present invention seek to target those users with a highest likelihood of conversion. However, rather than simply calculating a conversion likelihood score for each user and then targeting a set of highest-scored users, exemplary embodiments of the present invention provide a blended approach for user targeting in which a wide variety of data is used to both calculate conversion likelihood scores for each user and to determine an extent of similarity, e.g. a similarity score, between the various users. A blended score is determined for each user. The blended score takes into account both the conversion likelihood score for that user and also the conversion likelihood scores for other users that may be substantially similar to the given user, where the conversion likelihood scores for the similar users are weighted in accordance with a degree of similarity between the user and the similar user, for example, as expressed by the similarity score. The users with the highest blended score may then be targeted.

Data used to generate conversion scores may be noisy and/or sparse. To reduce conversion estimation error (e.g., false positives and false negatives), this blended approach may be used to adjust the conversion scores in accordance to how similar a given user is to the subset of users with similar demographics, usage patterns, touch/response behavior etc.

In performing exemplary embodiments of the present invention, a graphical representation of the users may be generated. In such a graph, each user may be represented by a node. Edges may connect each user with other users who are correlated, for example, by similarity scoring. The edge weight of each edge may be dependent upon the similarity score. The conversion likelihood score may also be represented on the graph, for example, using a node diameter that is proportional to the conversion likelihood score, or by depicting a second set of edges that connect each node to a common point representing the marketer. The weight of each of these marketer edges may be dependent upon the conversion likelihood score. According to another approach, the conversion likelihood score may simply be provided in association with each node, for example within the node or next to it.

Figure 1:
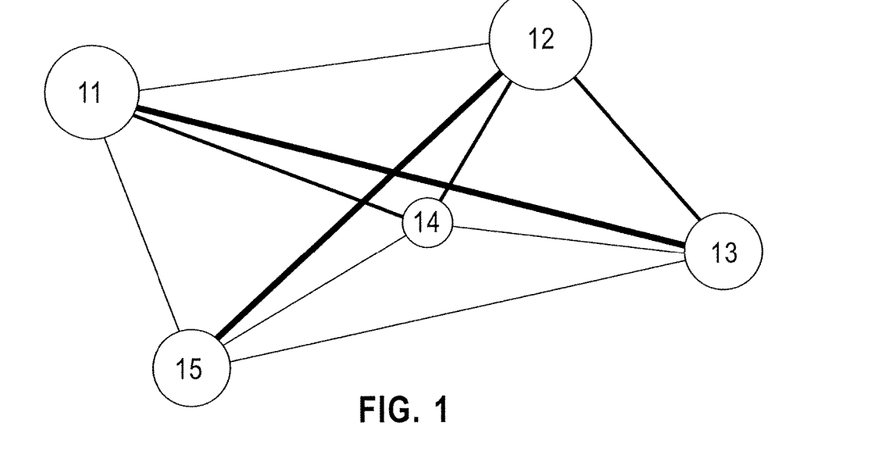
FIG. 1 is an example of a conversion likelihood/similarity score graph in accordance with exemplary embodiments of the present invention.

FIG. 1 is an example of a conversion likelihood/similarity score graph in accordance with exemplary embodiments of the present invention. While it is to be understood that actual graphs created in accordance with exemplary embodiments of the present invention may include many thousands of users, the graph illustrated in FIG. 1 has been simplified for the purposes of providing added clarity. In the graph, five nodes are depicted. The first node (node 11) is shown as having a next-to-largest diameter indicating a relatively high conversion likelihood score. The second node (node 12) is shown as having a largest diameter indicating an even higher conversion likelihood score. The third node (node 13) is shown as having a medium diameter indicating a moderate conversion likelihood score. The fourth node (node 14) is shown as having a smallest diameter indicating a relatively low conversion likelihood score. The fifth node (node 15) is also shown having a medium diameter indicating a moderate conversion likelihood score.

An edge connecting the first node (node 11) with the second node (node 12) is shown having a light edge weight indicating a relatively low degree of similarity between the users represented by the first and second nodes. An edge connecting the first node (node 11) with the third node (node 13) is shown having a heavy edge weight indicating a relatively high degree of similarity between the users represented by the first and third nodes. An edge connecting the first node (node 11) with the fourth node (node 15) is shown having a medium edge weight indicating a moderate degree of similarity between the users represented by the first and fourth nodes. The other edges are similarly depicted. It is to be understood that edges may be omitted where there is a very low or no degree of similarity between the users represented by a pair of nodes. The edge weights may conform to one of a limited set of possible edge weights or they may represent any real value.

Figure 2:
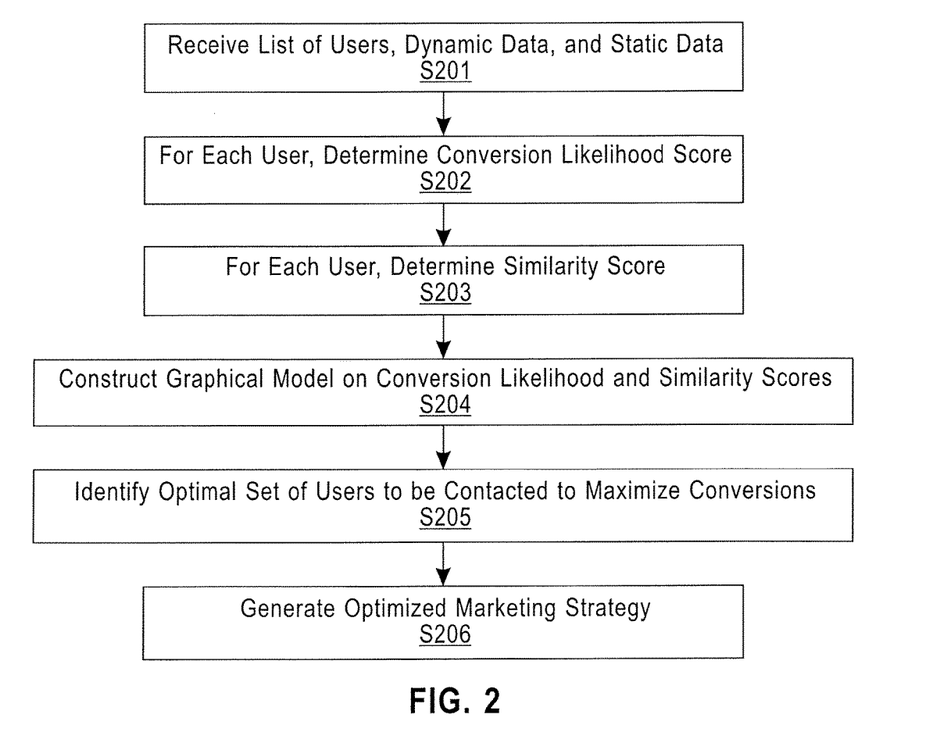
FIG. 2 is a flow chart illustrating an approach for performing targeted marketing for user conversion in accordance with exemplary embodiments of the present invention.

FIG. 2 is a flow chart illustrating an approach for performing targeted marketing for user conversion in accordance with exemplary embodiments of the present invention. First, a set of users may be received along with data such as dynamic data and static data (Step S201). The set of users may be a list of users of a cloud platform, cloud service, SaaS, etc. The set may include both trial users as well as paid users, as will be described in greater detail below.

The dynamic data may be data pertaining to the users and services offers that is continuously or periodically updated. Dynamic data is "dynamic" in that its values may be expected to change from time to time. The static data may be data that is defined once and then rarely, if ever, updated. Static data is "static" in that it is set on the onset and assumed not to change. Together, the static data and the dynamic data may be used either to compute conversion likelihood scores (confidence scores) or to compute similarity scores.

Examples of data used to compute confidence scores may include marketing interaction data which indicates user engagement levels with respect to the marketer; and static data such as opportunity data as a function of time, sales data and product details which may help identify potential advocates. Examples of data used to compute similarity scores may include service consumption data which helps identify users with similar behavior and potential advocates for new service adoptions; clickstream data which provides cookie level activity information pertaining to products viewed, whitepapers read, frequency, recency, etc.; and filmographic/demographic data, which may provide rich insight into user's interests, skillsets, and expertise.

For each user, a confidence score may be computed (Step S202). The confidence score CS may be computed in accordance with any known technique for estimating conversion likelihood. However, exemplary approaches for computing confidence scores are described in greater detail below with reference to the unit for computing conversion likelihood scores which is illustrated as element 309 in FIG. 3. It is understood that the data used to calculate the confidence score may be noisy and/or sparse and so the confidence score itself may be insufficient to adequately determine a marketing potential for each and every user.

For each pair of users, a similarity score (expressed as an edge weight W) may be calculated (Step S203). This score may be computed in accordance with any known technique for assessing similarity of people. However, exemplary approaches for computing similarity scores are described in greater detail below with reference to the unit for computing similarity scores which is illustrated as element 313 in FIG. 3

A graphical model, for example, one similar to that shown in FIG. 1, may then be constructed for the set of users based on the confidence scores and the similarity scores (Step S204). As described above, a node may be included in the graph for each user, the similarity scores between users may be depicted as edges between nodes, with the weight of the edge representing the particular similarity score. The confidence score may be depicted in one of a variety of ways, such as in the diameter of the node, the color of the node, a value associated with the node, etc.

Then, an optimal set of users may be identified such that directing marketing efforts to this optimal set of users maximizes conversions (Step S205). This may be done, for example, by calculating a marketing potential score (S) for each node of the graph. The following equation (eq. 1) may be used as an example of a manner in which marketing potential scores may be calculated in accordance with exemplary embodiments of the present invention:

$$S_i = \frac{1}{|\psi|} \sum_{j \in \psi} CS(j) + W_{ij} \times CS(i) \qquad \text{[Eq. 1]}$$

For each node i, all nodes having at least some measurable degree of connection to that node (quantity of this set denoted as ψ) are found and used to calculate $S_i$, which is the marketing potential score for that node, based on CS(i), which is the confidence score for node i, CS(j), which is the confidence score for node j (where j represents each connected node from 1 to ψ), and $W_{ij}$, which is the edge weight indicative of the similarity score between nodes i and j.

After the marketing potential score S has been calculated for each node, the nodes may be sorted by S and a set of N top nodes may be determined. An optimized marketing strategy may then be generated for the set of N top nodes (Step S206).

As discussed above, the set of users may include both trial users and paid users, even though there might be no interest in actually targeting users who are already paid users, exemplary embodiments of the present invention may still include these users in the set of users, calculate their respective conversion likelihood score, as if they were not already paid users, and may calculate their similarity scores. In this way, more information may be gleamed about the trail users, especially those who are strongly connected to the paid users.

According to some exemplary embodiments of the present invention, the confidence score for paid users may be set to a maximum value, which may be 1.0 on a scale from 0.0 to 1.0. Similarly, the marketing potential score S may be set to maximum (e.g. 1.0) for these nodes.

However, regardless of whether conversion likelihood scores are calculated or assigned as maximum for the paid users, nodes identified as paid users may be omitted from the list of top N nodes, and thus, the list of top N nodes may actually be those nodes with the top marketing potential score who are not paid users.

Figure 3:
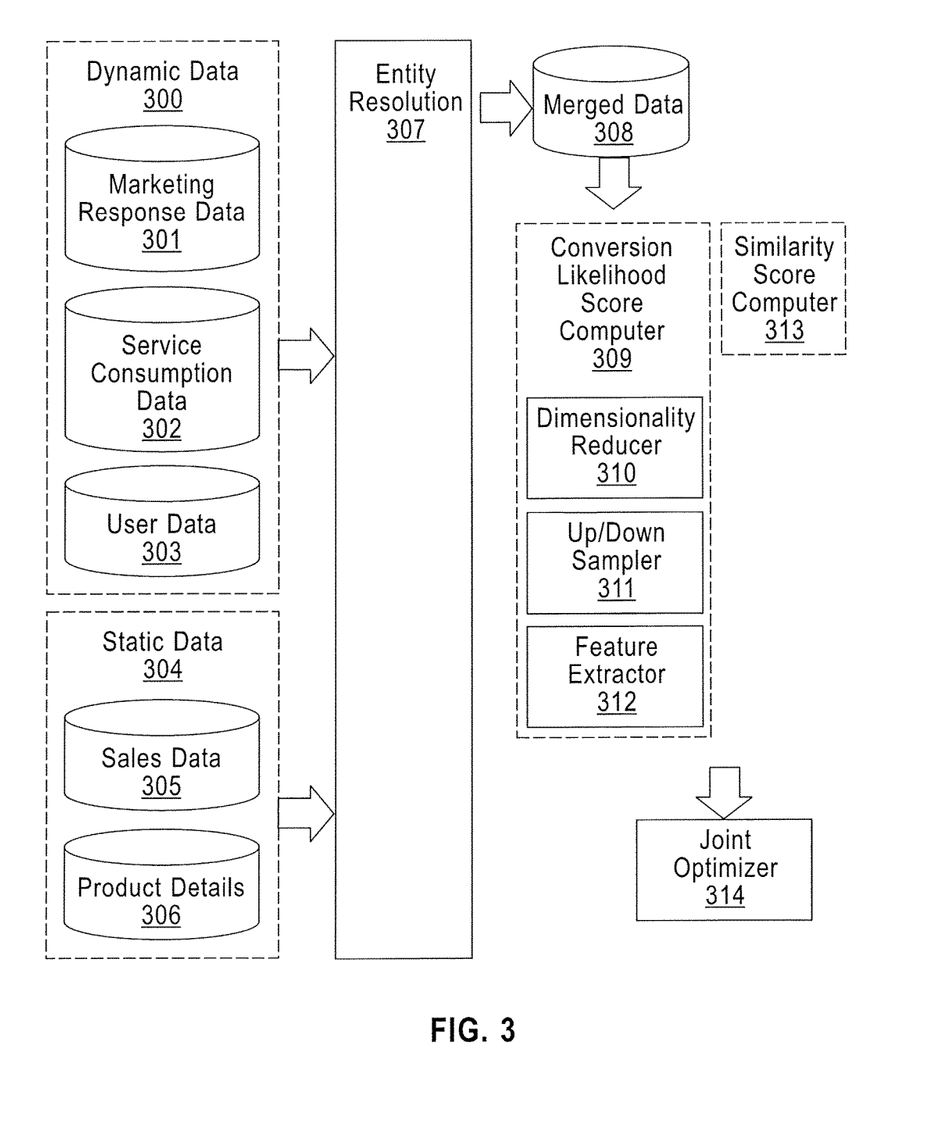
FIG. 3 is a schematic diagram illustrating a system for targeted marketing for user conversion in accordance with exemplary embodiments of the present invention.

FIG. 3 is a schematic diagram illustrating a system for targeted marketing for user conversion in accordance with exemplary embodiments of the present invention. As discussed above, various dynamic data 300 and static data 304 may be used. The dynamic data 300 may include database sources such as marketing response data 301, service consumption data 302, and user data 303. The static data 304 may include database sources such as sales data 305 and product details 306.

This data may be conditioned for use by an entity resolution unit 307 which may resolve duplicate and inconsistent data and may merge the data. The conditioned and merged data may be stored in a merged data database 308. From there, the conditioned and merged data may be used by a conversion likelihood scoring unit 309 to compute the conversion likelihood scores for each user, as described above; and may be used by a similarity scoring unit 313 to compute the similarity scores between the various pairs of users.

A joint optimization framework 314 may then be used to identify the optimal set of users to be contacted to maximize the number of conversions. The joint optimization framework 314 may provide, as output, an optimized marketing strategy.

The conversion likelihood scoring unit 309 may include a dimensionality reduction unit 310 which may perform dimensionality reduction on the data to learn hidden behavioral patterns. The conversion likelihood scoring unit 309 may also include a sampling unit 311 for performing upsampling and downsampling techniques to handle unbalanced data. The conversion likelihood scoring unit 309 may also include a feature extraction unit 312 which may perform feature extraction to identify those features with high predictive power.

The conversion likelihood scoring unit 309 may examine historical interactions with users and may use these historical interactions as training data. The features for predicting conversion likelihood may be modeled from this training data. For example, ensemble modeling may be performed using a classification tree, logistic registration, neural network, Bayesian network, CHAID, etc. Multiple models may be used and then predicted outcome (conversion from trial to paid) may be based on confidence-weighted voting of the multiple models used.

The similarity scoring unit 313 may mine user data from within the could platform to determine configuration and/or activity patterns. However, as actual data from cloud platforms may be low level and diverse, direct patterning and similarity mining may be facilitated by: (1) mapping configuration and log elements to a unified taxonomy with well-defined terms and attributes; (2) employing pattern mining, frequency log mining, etc.; and (3) for each user and layer, measuring low level statistical similarity and activity/behavior similarity.

As individual layer patterns and similarities may not be discriminatory enough, for example, many users may use similar software features, exemplary embodiments of the present invention may create a user-specific cloud configuration-behavior characterization ("fingerprint") which may be used to both uniquely identify a user and allow for generating a meaningful user similarity metric. This may be performed by: (1) computing customer cloud fingerprints as a vector of a union of patterns across layers plus a minimal distinction feature set. The minimal distinction feature set may be a subset of features from the user cloud fingerprint which uniquely, or nearly uniquely, and minimally, characterize the user. User cloud fingerprint similarity/distance may be calculated as a vector based similarity/distance, for example, a cosine similarity/Euclidian distance, between two fingerprints where at each dimension of the vector, the lower level similarity/distance is used to measure dimension-level similarity/distance.

Figure 4:
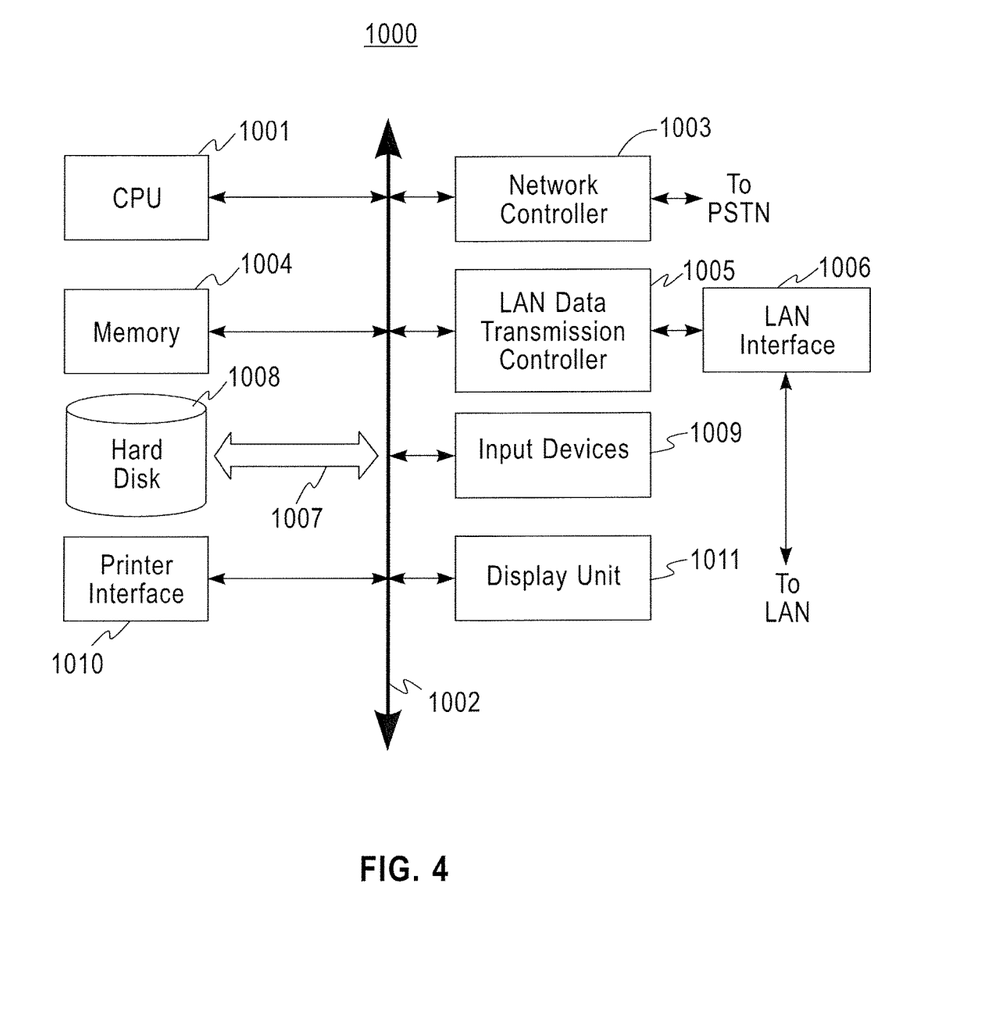
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for targeted marketing of a service for user conversion, comprising:
    receiving a list of a plurality of users, the plurality of users including both trial users and paid users of the service;
    receiving data pertaining to the plurality of users;
    determining, for each user of the plurality of users, a conversion likelihood score representing an estimation of how likely the user would be converted from a trial user to a paid user based on marketing interaction data which indicates user engagement levels with respect to a marketer of the service and static data including sales data and product details;
    determining, for each possible pair of users within the plurality of users, a similarity score representing how similar the users of the pair are to one another based on service consumption data of the pair of users;
    constructing a graph in which each node thereof represents each user of the plurality of users and edges between the nodes have edge weights representing the determined similarity scores, wherein each node is associated with a value representing its conversion likelihood score;
    calculating, for each user of the plurality of users, a marketing potential score using both the node-associated-values and the edge weights of the graph; and
    constructing a set of target users including trial users having highest marketing potential scores,
    wherein determining the conversion likelihood score, comprises:
    reducing dimensionality of the received data pertaining to the users;
    up-sampling or down-sampling the dimensionality-reduced data to remediate unbalanced nature of the dimensionally-reduced data;
    extracting features from the up/down-sampled data to identify features having high predictive power;
    training a machine learning model using the extracted features to model conversion likelihood; and
    applying the trained model to predict the conversion likelihood scores.

2. The method of claim 1, wherein the data pertaining to the plurality of users includes dynamic data and static data.

3. The method of claim 1, wherein the conversion likelihood scores for paid users is set as a maximum value.

4. The method of claim 1, wherein the marketing potential score is calculated as;

$$S_i = \frac{1}{|\psi|} \sum_{j \in \psi} CS(j) + W_{ij} \times CS(i)$$

where $S_i$ is the marketing potential score for each user node i, CS(i) is the conversion likelihood score for each user node i, CS(j) is the conversion likelihood score for each user node j, $W_{ij}$ is the edge weight for the edge connecting each user node i with each user node j, and ψ represents a number of nodes j that are connected to each node i by an edge.

5. A method for selecting users for targeted marketing of a service, comprising:
receiving a list of a plurality of users of the service;
receiving data pertaining to the plurality of users;
determining, for each user of the plurality of users, a conversion likelihood score representing an estimation of how likely the user is to consummate a purchase as a result of the targeted marketing, based on marketing interaction data which indicates user engagement levels with respect to a marketer of the service and static data including sales data and product details;
determining, for each possible pair of users within the plurality of users, a similarity score representing how similar the users of the pair are to one another based on service consumption data of the pair of users;
constructing a graph in which each node thereof represents each user of the plurality of users and edges between the nodes have edge weights representing the determined similarity scores, wherein each node is associated with a value representing its conversion likelihood score;
calculating, for each user of the plurality of users, a marketing potential score using both the node-associated-values and the edge weights of the graph; and
constructing a set of target users including the users of the plurality of users having highest marketing potential scores,
wherein determining the conversion likelihood score, comprises:
reducing dimensionality of the received data pertaining to the users;
up-sampling or down-sampling the dimensionality-reduced data to remediate unbalanced nature of the dimensionally-reduced data;
extracting features from the up/down-sampled data to identify features having high predictive power;
training a machine learning model using the extracted features to model conversion likelihood; and
applying the trained model to predict the conversion likelihood scores.

6. The method of claim 5, wherein a joint optimization framework is used to identify the set of target users that maximize consummation of purchases as a result of the targeted marketing.

7. The method of claim 5, wherein determining the similarity score between two users, comprises:
mining configuration and activity patterns of the two users from the service consumption data, the service consumption data including cloud layer configurations and logs;
creating a customer-specific cloud configuration-behavior characterization for each user; and
measuring the similarity between the two users based on the mined configuration and activity patterns and the customer-specific cloud configuration-behavior characterization.

8. A computer system comprising:
a processor; and
a non-transitory, tangible, program storage medium, readable by the computer system, embodying a program of instructions executable by the processor to perform method steps for method for targeting marketing for user conversion of a service, the method comprising:
receiving a list of a plurality of users of the service, the plurality of users including both trial users and paid users;
receiving data pertaining to the plurality of users;
determining, for each user of the plurality of users, a conversion likelihood score representing an estimation of how likely the user would be converted from a trial user to a paid user based on marketing interaction data which indicates user engagement levels with respect to a marketer of the service and static data Including sales data and product details;
determining, for each possible pair of users within the plurality of users, a similarity score representing how similar the users of the pair are to one another based on service consumption data of the pair of users;
constructing a graph in which each node thereof represents each user of the plurality of users and edges between the nodes have edge weights representing the determined similarity scores, wherein each node is associated with a value representing its conversion likelihood score;
calculating, for each user of the plurality of users, a marketing potential score using both the node-associated-values and the edge weights of the graph; and
constructing a set of target users including trial users having highest marketing potential scores;
wherein determining the conversion likelihood score, comprises:
reducing dimensionality of the received data pertaining to the users;
up-sampling or down sampling the dimensionality-reduced data to remediate unbalanced nature of the dimensionality-reduced data;
extracting features from the up/down-sampled data to identify features having high predictive power;
training a machine learning model using the extracted features to model conversion likelihood; and
applying the trained model to predict the conversion likelihood scores.

9. The computer system of claim 8, wherein constructing a set of target users includes constructing a graph in which each node thereof represents each user of the plurality of users and edges between the nodes have edge weights representing the determined similarity scores, wherein each node is associated with a value representing its conversion likelihood score.

10. The computer system of claim 9, wherein the marketing potential score is calculated as:

$$S_i = \frac{1}{|\psi|} \sum_{j \in \psi} CS(j) + W_{ij} \times CS(i)$$

where $S_i$ is the marketing potential score for each user node i, CS(i) is the conversion likelihood score for each user node i, CS(j) is the conversion likelihood score for each user node j, $W_{ij}$ is the edge weight for the edge connecting each user node i with each user node j, and ψ represents a number of nodes j that are connected to each node i by an edge.

11. The computer system of claim 8, wherein the conversion likelihood scores for paid users is set as a maximum value.

* * * * *